US011394748B2

(12) United States Patent
Yuan

(10) Patent No.: US 11,394,748 B2
(45) Date of Patent: Jul. 19, 2022

(54) AUTHENTICATION METHOD FOR ANONYMOUS ACCOUNT AND SERVER

(71) Applicant: TENCENT TECHNOLOGY (SHENZHEN) COMPANY LIMITED, Guangdong (CN)

(72) Inventor: Zhe Yuan, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 463 days.

(21) Appl. No.: 16/601,693

(22) Filed: Oct. 15, 2019

(65) Prior Publication Data

US 2020/0045085 A1 Feb. 6, 2020

Related U.S. Application Data

(63) Continuation of application No. PCT/CN2018/102189, filed on Aug. 24, 2018.

(30) Foreign Application Priority Data

Sep. 13, 2017 (CN) .......................... 201710823493.2

(51) Int. Cl.
*H04L 9/40* (2022.01)
(52) U.S. Cl.
CPC .......... *H04L 63/20* (2013.01); *H04L 63/0421* (2013.01); *H04L 63/0876* (2013.01); *H04L 63/10* (2013.01)
(58) Field of Classification Search
CPC . H04L 63/20; H04L 63/0421; H04L 63/0876; H04L 63/10
See application file for complete search history.

(56) References Cited

U.S. PATENT DOCUMENTS 8,688,991 B1 * 4/2014 Sunil ................ H04N 21/26613
713/176

FOREIGN PATENT DOCUMENTS

CN 101448002 A 6/2009
CN 102843366 A 12/2012
(Continued)

OTHER PUBLICATIONS

International Search Report of PCT/CN2018/102189 dated Nov. 1, 2018 [PCT/ISA/210].
(Continued)

*Primary Examiner* — Matthew T Henning
(74) *Attorney, Agent, or Firm* — Sughrue Mion, PLLC

(57) ABSTRACT

Provided is an anonymous account authentication method, apparatus and storage medium. The method may include receiving, from a user, an anonymous account authentication request, requesting a resource owner to perform authentication on a use permission of a resource using an anonymous account, obtaining a first version number of the resource owner according to the anonymous account authentication request, the first version number representing an identification number of a current version of an authentication policy table, obtaining a linear policy table based on the first version number matching a second version number, the second version number representing an identification number of a current version of the linear policy table, obtaining an authentication policy set associated with the resource from the linear policy table, and performing authentication by using the authentication policy set, the authentication policy set comprising at least one authentication policy.

20 Claims, 4 Drawing Sheets

(56) References Cited

FOREIGN PATENT DOCUMENTS

| CN | 106790262 A | 5/2017 |
|---|---|---|
| WO | 2010/072158 A1 | 7/2010 |

OTHER PUBLICATIONS

Written Opinion of PCT/CN2018/102189 dated Nov. 1, 2018 [PCT/ISA/237].
The State Intellectual Property Office of the P.R. of China Communication dated Sep. 2, 2020 issued in Application No. 201710823493.2.
Written Opinion in International Application No. PCT/CN2018/102189, dated Nov. 1, 2018.

* cited by examiner

AUTHENTICATION METHOD FOR ANONYMOUS ACCOUNT AND SERVER

CROSS-REFERENCE TO RELATED APPLICATIONS

This application is a continuation of International Patent Application No. PCT/CN2018/102189 filed on Aug. 24, 2018, which claims priority from Chinese Patent Application No. 201710823493.2, entitled "AUTHENTICATION METHOD FOR ANONYMOUS ACCOUNT AND SERVER" and filed in the Chinese Patent Office on Sep. 13, 2017, which are incorporated herein by reference in their entireties.

BACKGROUND

1. Field

Embodiments of the present disclosure relate to the field of computer technologies, and in particular, to an account authentication technology.

2. Description of Related Art

Presently, cloud services are rapidly developing and widely being applied. To protect resources stored on a cloud platform, before a user performs an operation on a resource, a server needs to first perform authentication on an account used by the user to prevent the user from having unauthorized access to and performing an unauthorized operation on the resource. An anonymous account, as a special account form, may be used for anonymous access to resources on the cloud platform.

In general, authentication policies of anonymous accounts and authentication policies of ordinary accounts may be stored in a unified way, and when a user uses an anonymous account for access, an authentication policy corresponding to the ordinary account may be traversed, and the stored authentication policies for anonymous account may be used for authentication.

However, a cloud platform stores enormous resources, a lot of different authentication policies that are generated according to different anonymous accounts, and when performing an authentication operation, a server needs to traverse authentication policies of many resource owners. In addition, because access traffic of anonymous accounts is generally relatively large, the authentication operations on the anonymous accounts may consume a lot of time and system resources. As such, an overall authentication operation load of the cloud platform is increased, and authentication operation efficiency and system performance are reduced.

SUMMARY

Embodiments of the present disclosure provide an anonymous account authentication method and a server, thereby reducing time and system resources consumed by authentication operations, lowering an overall authentication operation load of a cloud platform, and improving authentication operation efficiency and performance of a cloud platform system.

According to an embodiment, there is an anonymous account authentication method, the method performed by a server, the method may include receiving, from a user, an anonymous account authentication request, requesting a resource owner to perform authentication on a use permission of a resource using an anonymous account; obtaining a first version number of the resource owner according to the anonymous account authentication request, the first version number representing an identification number of a current version of an authentication policy table, the authentication policy table comprising a correspondence between a resource set and a permission set, wherein the resource set includes a plurality of resource contents and the permission set includes a plurality of permission information; obtaining a linear policy table based on the first version number matching a second version number, the second version number representing an identification number of a current version of the linear policy table, the linear policy table comprising a one-to-one correspondence between each of the plurality of resource contents in the resource set and each of the plurality of permission information in the permission set; obtaining an authentication policy set associated with the resource from the linear policy table; and performing authentication by using the authentication policy set, the authentication policy set comprising at least one authentication policy, the at least one authentication policy being at least one correspondence between one of the plurality of resource contents and one of the plurality of permission information.

According to another embodiment, there is an anonymous account authentication server, including at least one memory configured to store computer program code; and at least one processor configured to access the program code and operate as instructed by the computer program code. The computer program code may include receiving code configured to cause the at least one processor to receive, from a user, an anonymous account authentication request, requesting a resource owner to perform authentication on a use permission of a resource using an anonymous account; first obtaining code configured to cause the at least one processor to obtain a first version number of the resource owner according to the anonymous account authentication request received by the receiving code, the first version number representing an identification number of a current version of an authentication policy table, the authentication policy table comprising a correspondence between a resource set and a permission set, wherein the resource set includes a plurality of resource contents and the permission set includes a plurality of permission information; second obtaining code configured to cause the at least one processor to obtain a linear policy table based on the first version number obtained by the first obtaining code matching a second version number, the second version number representing an identification number of a current version of the linear policy table, the linear policy table comprising a one-to-one correspondence between each of the plurality of resource contents in the resource set and each of the plurality of permission information in the permission set; third obtaining code configured to cause the at least one processor to obtain an authentication policy set associated with the resource from the linear policy table obtained by the second obtaining code; and authentication code configured to cause the at least one processor to perform authentication by using the authentication policy set obtained by the third obtaining code, the authentication policy set comprising at least one authentication policy, the at least one authentication policy being the correspondence between at least one of the plurality of resource contents and at least one of the plurality of permission information.

According to another embodiment, there is a non-transitory computer-readable storage medium, storing executable instructions, the executable instructions capable of causing a computer to receive, from a user, an anonymous account authentication request, requesting a resource owner to perform authentication on a use permission of a resource using an anonymous account; obtain a first version number of the resource owner according to the anonymous account authentication request, the first version number representing an identification number of a current version of an authentication policy table, the authentication policy table comprising a correspondence between a resource set and a permission set; obtain a linear policy table based on the first version number matching a second version number, the second version number representing an identification number of a current version of the linear policy table, the linear policy table comprising a one-to-one correspondence between each of the plurality of resource contents in the resource set and each of the plurality of permission information in the permission set; obtain an authentication policy set associated with the resource from the linear policy table; and perform authentication by using the authentication policy set, the authentication policy set comprising at least one authentication policy, the at least one authentication policy being a correspondence between at least one of the plurality of resource contents and at least one of the plurality of permission information.

DESCRIPTION OF EMBODIMENTS

Embodiments of the present disclosure provide an anonymous account authentication method and a server, reducing time and system resources consumed by authentication operations, lowering an overall authentication operation load of a cloud platform, and improving authentication operation efficiency and performance of a cloud platform system.

In the present disclosure, the terms "first", "second", "third", "fourth", and so on are intended to distinguish between different objects, and may not be limited to a particular order or sequence. It may be understood that data used in this way may be interchanged so that the embodiments, for example, may be implemented in a sequence other than those sequences illustrated or described herein. Moreover, the terms "include", "contain" and any other variants mean to cover the non-exclusive inclusion, for example, a process, a method, a system, a product, or a device that includes a list of steps or units may not necessarily be limited to those units, but may include other steps or units not expressly listed or inherent to such a process, method, system, product, or device.

Figure 1:
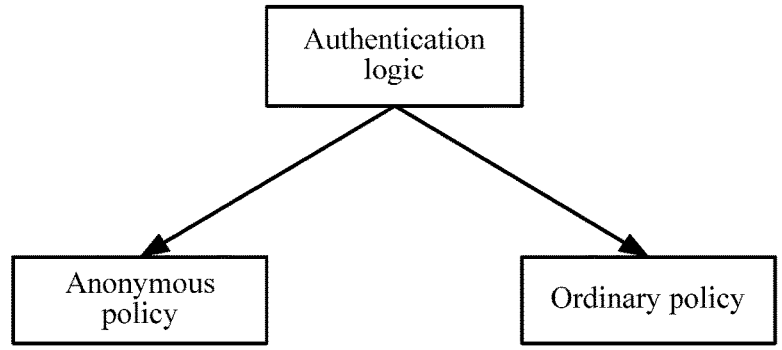
FIG. 1 is a schematic diagram of authentication logic according to an embodiment.

It may be understood that the present disclosure is used to support authentication on an anonymous account for a cloud service. FIG. 1 is a schematic diagram of authentication logic according to an embodiment. Anonymous account authentication policies and ordinary account authentication policies may be stored independently. During authentication, an anonymous account authentication policy and a conventional ordinary account authentication policy that are related to a current operation context may need to be read to finally determine whether authentication succeeds. The current operation context may meantime of starting a cloud service and a use scenario of the cloud service.

Figure 2:
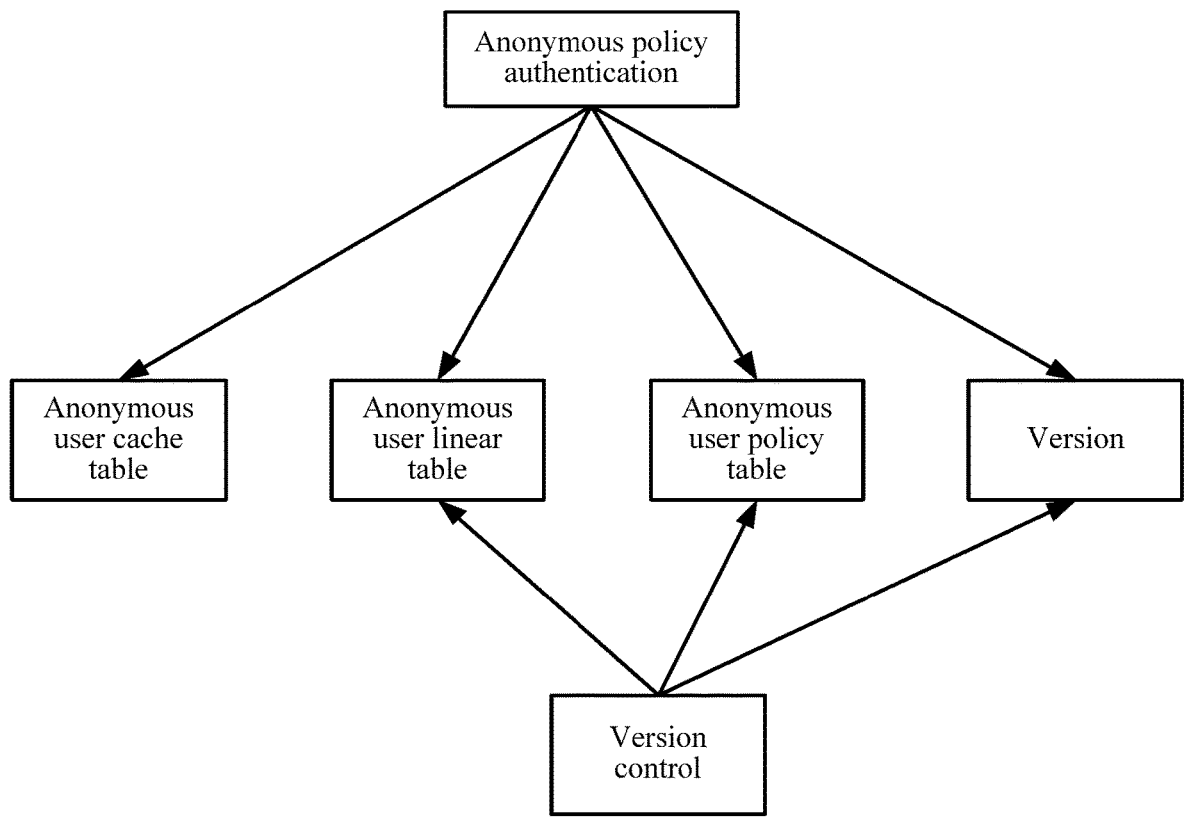
FIG. 2 is a schematic diagram of an anonymous account authentication policy according to an embodiment.

When authentication is performed on a use permission of a resource requested by an anonymous account, a framework related to the anonymous account needs to be used. FIG. 2 is a schematic diagram of an anonymous account authentication policy according to an embodiment. As shown in FIG. 2, authentication system may include three parts, namely, an anonymous user authentication logic service, an anonymous user policy storage layer and anonymous user-related policy version control.

An authentication logic layer may include an anonymous policy authentication module. The module may be configured to complete an actual authentication operation. The module may receive an authentication request, obtain user information, resource information, and operation information in the authentication request, and may access a policy related to the request from an authorization policy database corresponding to the service, and then, perform analysis and calculation. Thereafter, the module may finally notify a user of an authentication result. The policy may mean a policy of an anonymous account.

The anonymous user policy storage layer may include an anonymous user cache table, an anonymous user linear table, an anonymous user policy table, and a version. The anonymous user cache table may be used to directly cache a final authentication result. The anonymous user linear table may be a relationship table after expansion used to record a resource set and a permission set. The anonymous user policy table may be used to store a conventional authentication policy. A version may be a version management table related to linear table updates and authentication. A keyword of the version is an identifier of a resource owner. A version content is a timestamp of a last change of an anonymous user and a policy related to a specific resource owner. A resource owner may be any service provider associated with an account of a user.

A version control is a core and main control of the entire system. The version control expands a linear policy by using account granularity as a unit, and records a version of the policy set. When policy information of any account is updated, a policy table version number of the account is updated, and when the version number changes, the version control system may update a linear table again.

Figure 3:
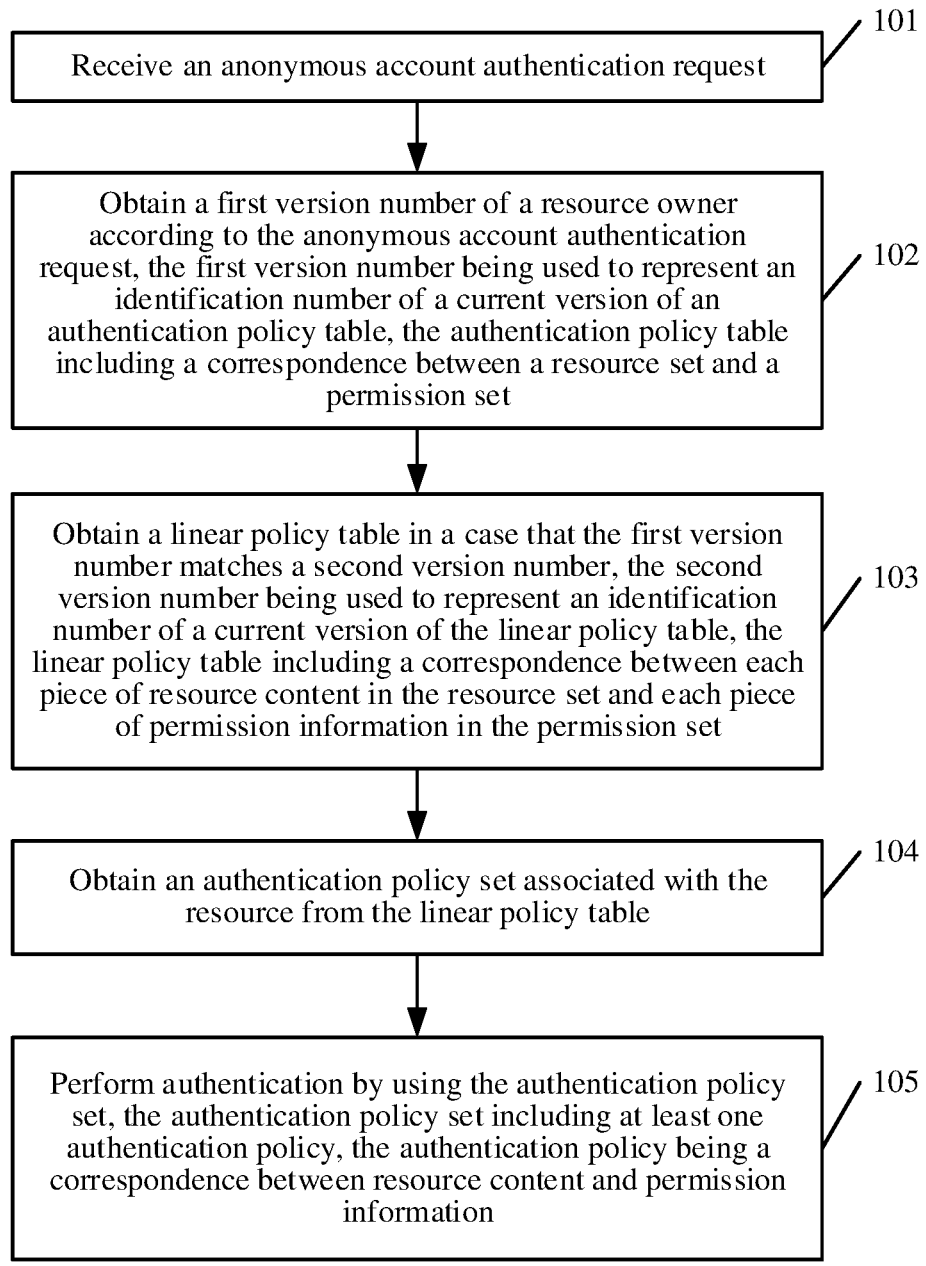
FIG. 3 is a flowchart of an anonymous account authentication method according to an embodiment.

The anonymous account authentication method is described below from a perspective of a server. Referring to FIG. 3, an embodiment of an anonymous account authentication method may include the following steps.

In step 101, the method may include receiving an anonymous account authentication request.

According to an embodiment, a server may receive an anonymous account authentication request from a user. The anonymous account authentication request is usually initiated by the user through a cloud service platform. The anonymous account authentication request may be used to request a resource owner to perform authentication on a use permission of a resource by using an anonymous account.

The anonymous account is a special account on a cloud service platform, and a cloud service user may acquire a permission of using an anonymous account. After the authentication is approved, the resource owner may grant the user with a use permission of a specific resource or use permissions of some resources, to control a use permission of the resource for the user, including which users may access the resource and the users' ways of accessing the resource.

In step 102, the method may include obtaining a first version number of the resource owner according to the anonymous account authentication request, the first version number representing an identification number of a current version of an authentication policy table, the authentication policy table including a correspondence between a resource set and a permission set.

According to an embodiment, the server may obtain a first version number of the resource owner according to the anonymous account authentication request. Specifically, the first version number may represent an identification number of a current version of an authentication policy table. The authentication policy table may include a correspondence between a resource set and a permission set. Referring to Table 1 below, an example of an authentication policy table is provided.

TABLE 1

| Resource owner | Resource set | Permission set |
| --- | --- | --- |
| A | a, b, c, and d | Read permitted and write permitted |
| B | a, c, and d | Read permitted and write not permitted |
| C | c and d | Read permitted and write permitted |
| D | b, c, and d | Read permitted and write not permitted |

Table 1 is merely an example. In actual applications, a resource set and a permission set may alternatively be associated with each other in another manner. The embodiments are not limited to the above Table 1. An authentication policy table corresponding to each resource owner has a first version number.

In step 103, the method may include obtaining a linear policy table in a case that the first version number matches a second version number, the second version number representing an identification number of a current version of the linear policy table, the linear policy table including a correspondence between each piece of resource content in the resource set and each piece of permission information in the permission set.

According to an embodiment, the resource owner further corresponds to a linear policy table. The linear policy table has a second version number. The linear policy table may include a correspondence between each piece of resource content in the resource set and each piece of permission information in the permission set. The linear policy table is mainly used to record resource content, permission information, a root account to which a resource belongs, and the like. Referring to Table 2 below, an example of a linear policy table is provided.

TABLE 2

| Resource owner | Resource content | Permission information |
| --- | --- | --- |
| A | a | Read permitted and write permitted |
| A | b | Read permitted and write permitted |

TABLE 2-continued

| Resource owner | Resource content | Permission information |
| --- | --- | --- |
| A | c | Read permitted and write permitted |
| A | d | Read permitted and write permitted |
| B | a | Read permitted and write not permitted |
| B | c | Read permitted and write not permitted |
| B | d | Read permitted and write not permitted |
| C | c | Read permitted and write permitted |
| C | d | Read permitted and write permitted |
| D | b | Read permitted and write not permitted |
| D | c | Read permitted and write not permitted |
| D | d | Read permitted and write not permitted |

Table 2 is merely an example. In actual applications, resource content and permission information may alternatively be associated with each other in another manner. The embodiments are not limited to the above Table 2. A linear policy table corresponding to each resource owner has a second version number.

A correspondence included in the linear policy table may be a one-to-one correspondence between a piece of resource content and a piece of permission information or a correspondence between a plurality of pieces of resource content and a plurality of pieces of permission information.

The linear policy table and the authentication policy table may have the same content, but have different expression forms. For example, the linear policy table is content of the authentication policy table after expansion. That is, the linear policy table exemplifies a one-dimensional policy expanded by using a resource owner as a unit.

In step 104, the method may include obtaining an authentication policy set associated with the resource from the linear policy table.

According to an embodiment, when a first version number matches a second version number, assuming that a resource d is requested for by an anonymous account authentication request, pieces of permission information related to the resource d is directly extracted from the linear policy table to form an authentication policy set, and the pieces of permission information are all related to an anonymous account initiating the anonymous account authentication request. Table 3 below is another example of a linear policy table.

TABLE 3

| Resource owner | Resource content | Permission information |
| --- | --- | --- |
| A | d | Read permitted and write permitted |
| B | d | Read permitted and write not permitted |
| C | d | Read permitted and write permitted |
| D | d | Read permitted and write not permitted |

Table 3 is merely an example. In actual applications, an authentication policy set may be generated according to a linear policy table. The embodiments are not limited to the above Table 3. The authentication policy set may include at least one authentication policy, and the authentication policy may be a correspondence between resource content and permission information.

In step 105, the method may include performing authentication by using the authentication policy set, the authentication policy set including at least one authentication policy, the authentication policy being a correspondence between resource content and permission information.

Here, the server may perform authentication by using an authentication policy set similar to Table 3. For example, in a case that an anonymous account requests for performing a read operation on resource content d of a resource owner A, after obtaining an authentication policy set corresponding to the resource content d, the server may determine that permission information of the resource content d of the resource owner A is read permitted and write permitted. Accordingly, authentication is performed on a use permission of the read operation requested by the anonymous account, to determine whether the anonymous account may read the resource content d of the resource owner A.

The authentication policy set may include at least one authentication policy. The authentication policy is used to indicate a correspondence between resource content and permission information. It may be understood that the authentication policy may be a part of information in the linear policy table. For example, the linear policy table may include 100 authentication policies.

According to an embodiment, an anonymous account authentication method may include first, receiving, by a server, an anonymous account authentication request, the anonymous account authentication request being used to request a resource owner to perform authentication on a use permission of a resource by using an anonymous account. The method may include obtaining a first version number of the resource owner according to the anonymous account authentication request, the first version number representing an identification number of a current version of an authentication policy table, the authentication policy table including a correspondence between a resource set and a permission set. The method may further include obtaining a linear policy table in a case that the first version number matches a second version number, the second version number representing an identification number of a current version of the linear policy table, the linear policy table including a correspondence between each piece of resource content in the resource set and each piece of permission information in the permission set, and obtaining, by the server, an authentication policy set associated with the resource from the linear policy table and performing authentication by using the authentication policy set. In the foregoing manner, when an anonymous account authentication operation is performed, an authentication result may be determined by traversing authentication policies of a resource owner related to anonymous accounts, and traversed content does not include authentication policies of other resource owners, thereby reducing time and system resources consumed by authentication operations, lowering an overall authentication operation load of a cloud platform, and improving authentication operation efficiency and performance of a cloud platform system.

According to an embodiment shown in FIG. 3, in the anonymous account authentication method, after the obtaining a first version number of the resource owner according to the anonymous account authentication request, the method may further include performing authentication by using the authentication policy table in a case that the first version number does not match the second version number.

In this embodiment, when the first version number of the authentication policy table does not match the second version number of the linear policy table, the server may perform authentication on the anonymous account by using the authentication policy table.

Specifically, the first version number matching the second version number may indicate that the two version numbers are the same, or that the two version numbers satisfy a preset association relationship. However, when the first version number does not match the second version number, authentication may be performed by using the authentication policy table. For example, assuming that the anonymous account requests for performing some operations on the resource content d of the resource owner A, the server first finds a resource set related to the resource owner A from the authentication policy table. Using Table 1 as an example, a resource set a, b, c, and d is obtained. Then, the resource content d is parsed out from the resource set, and further, a permission set is parsed, to obtain permission content of the resource content d, where the permission content is "read permitted and write permitted", so as to determine whether the operations, requested for performing by the anonymous account, on the resource content of the resource owner A satisfy the permission content corresponding to the resource d.

Alternatively, when the first version number does not match the second version number, an authentication policy table needs to be obtained and authentication needs to be performed on the anonymous account by using the authentication policy table. In the foregoing manner, authentication may be performed by preferentially using a conventional authentication policy table. On one hand, sifting through a policy table may be performed, thereby improving flexibility of authentication. On the other hand, the authentication policy table is usually a policy table that is preferentially updated, and the linear policy table is a policy table updated according to the authentication policy table. Therefore, when it is found that the two version numbers do not match, an updated authentication policy table may be selected first, thereby improving applicability of the solution.

Furthermore, the anonymous account authentication method may include detecting whether the resource set and/or the permission set changes, and updating the authentication policy table in a case that the resource set and/or the permission set changes.

For example, the authentication policy table may be updated before the server performs authentication on the anonymous account or after the server performs authentication on the anonymous account.

Figure 4:
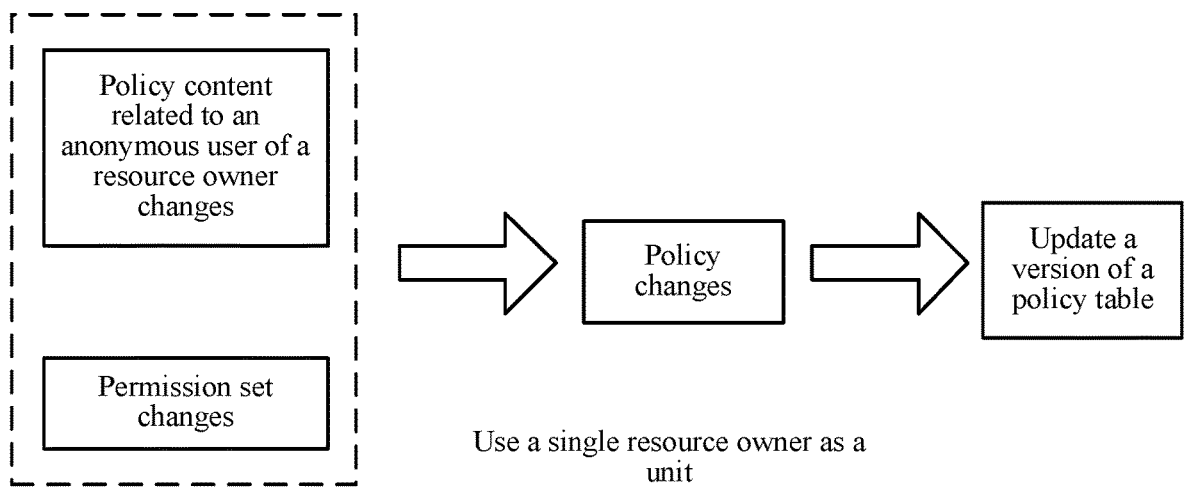
FIG. 4 is a schematic diagram of updating an authentication policy table according to an embodiment.

FIG. 4 is a schematic diagram of updating an authentication policy table according to an embodiment. As shown in FIG. 4, a single resource owner may be used as a unit, and assuming that the resource owner is a resource owner A, the server first detects whether at least one of a resource set and a permission set changes. That is, detecting whether content of an authentication policy related to the anonymous account of the resource owner A changes. In addition, the server may further detect whether the permission set changes. Once either of them changes, a corresponding authentication policy may be updated, and further, an identification number of a current version of the authentication policy table also may be updated, that is, updating the first version number.

Further, a process of updating the authentication policy table will be described. Specifically, the server needs to detect whether the resource set and/or permission set changes, and in a case where the resource set and/or permission set changes, the server may update the authentication policy table. As such, the server may be enabled to obtain information related to the authentication policy on time, update the authentication policy in real time, thereby improving applicability of the solution and improving reliability of anonymous account authentication.

According to the embodiment shown in FIG. 3, in the anonymous account authentication method provided, the detecting whether the resource set and/or the permission set changes may further include detecting whether the resource content in the resource set changes, the resource content representing a resource provided by the resource owner; or detecting whether the permission information in the permission set changes, the permission information representing a use permission of the resource content; or detecting whether a correspondence between each piece of the resource content in the resource set and each piece of the permission information in the permission set changes.

According to an embodiment, the server may determine whether a resource set and/or a permission set changes by using three types of rules.

The first type is detecting, by the server, whether the resource content in the resource set changes. The resource content may represent a resource provided by the resource owner. For example, assuming that a resource owner A corresponds to resource content a, and later the resource content a changes to "resource content x", it may be considered that the resource set has changed.

The second type is detecting whether the permission information in the permission set changes. The permission information may represent a use permission of the resource content. For example, assuming that a resource owner A corresponds to resource content a, the corresponding permission information indicates "read permitted and write permitted", and later, the permission information changes to "read permitted and write not permitted", it may be considered that the permission set has changed.

The third type is detecting whether a correspondence between each piece of the resource content in the resource set and each piece of the permission information in the permission set changes. For example, assuming that a resource owner A corresponds to resource content a, its permission information indicates "read permitted and write permitted", and subsequently, the resource owner A changes to correspond to resource content b, and the permission information is "read not permitted and write permitted." Here, it may be considered that the correspondence between the resource set and the permission set has changed.

Further, three conditions for determining that the authentication policy table needs to be updated are respectively described herein. That is, detecting whether the resource content in the resource set changes, detecting whether the permission information in the permission set changes, and detecting whether a correspondence between each piece of the resource content in the resource set and each piece of the permission information in the permission set changes. As such, at least one of the conditions may be used to determine that the authentication policy table needs to be updated, thereby improving flexibility and diversity of the solution, and maintaining reliability of authentication by defining the conditions.

According to the embodiment shown in FIG. 3, in the anonymous account authentication method provided, after the updating the authentication policy table, the method may further include updating the linear policy table according to the updated authentication policy table.

Specifically, after performing an update operation on the authentication policy table, the server also needs to update the linear policy table according to the updated authentication policy table.

Policy management may include two parts: (1) updating the authentication policy table and (2) updating the linear policy table. Since all the policies herein are related to the anonymous account, for fine-grained version management, all policies may be subdivided by resource owners, and a version may be defined for a policy related to an anonymous account of each resource owner, and in a case that any policy related to the resource owner changes, a corresponding version may be updated.

Figure 5:
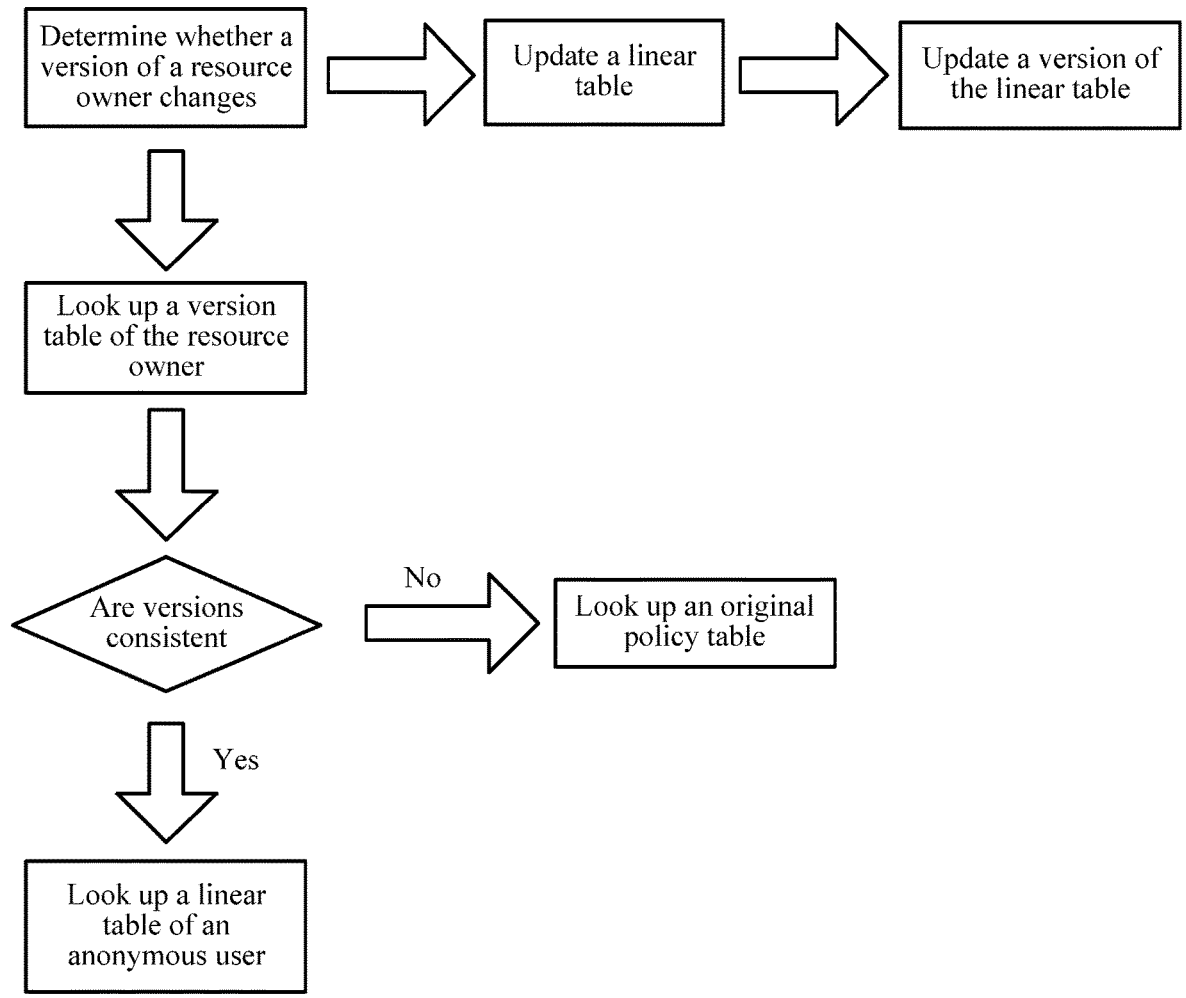
FIG. 5 is a schematic diagram of updating a linear policy table according to an embodiment.

FIG. 5 is a schematic diagram of updating a linear policy table according to an embodiment. An organization structure of the linear table may be a sub-account, an account, an application programming interface, a resource, and a permission in a one-dimensional relationship, so that during authentication, the linear table may be intuitively arranged. For an authentication request of an anonymous account, a version number corresponding to a resource owner in the authentication request may be first viewed. When an identification number of a current version of the authentication policy table is inconsistent with an identification number of a current version of the linear policy table, it indicates that there was a recent update on authentication policy of an anonymous account of the resource owner. For a service having a very high timeliness requirement, a conventional authentication policy table may be looked up, otherwise, the linear policy table may be directly looked up.

It may be understood that the server may further optimize a version number check, and enable an authentication service to register a version change message. Once a version changes, all authentication services may be notified, and the authentication services may perform authentication by reading an original policy table before the linear policy table is completely updated.

In a version control procedure, consistency between the version of the linear policy table and the version of the authentication policy table may be verified at a very short time interval. When there is an inconsistency between the linear policy table and the version of the authentication policy table, the linear table may be updated. After the update is completed, in the linear policy table and the authentication policy table, identification numbers of current versions of a same anonymous account are kept consistent.

Further, after updating the authentication policy table, the server may further update the linear policy table according to the updated authentication policy table. In the foregoing manner, in a case that the authentication policy table does not match the linear policy table, indicating that an anonymous user policy of the resource owner has recently been updated, the authentication policy table needs to be updated first and then the linear policy table is updated, thereby ensuring synchronization of the two policy tables, and improving reliability of authentication. However, for a service having a very high timeliness requirement, a conventional authentication policy table may be looked up, thereby ensuring real-time performance authentication.

According to the embodiment shown in FIG. 3, in the anonymous account authentication method provided, the obtaining the first version number of the resource owner according to the anonymous account authentication request may include determining the anonymous account according to the anonymous account authentication request, and obtaining the first version number from a version management table according to the anonymous account and the resource owner of the anonymous account request.

According to an embodiment, the obtaining, by the server, the first version number of the resource owner may specifically include the following steps: (1) determining, by the server, the corresponding anonymous account according to the received anonymous account authentication request, and (2) reading, from the server, the first version number from the stored version management table according to the anonymous account and the resource owner of the anonymous account request.

The version management table stored in the server may include the first version number corresponding to the authentication policy table and the second version number corresponding to the linear policy table. Once the authentication policy table is updated, a corresponding version number is also updated, and the version management table may erase a version number of an original version or reserve the version number of the original version. However, the version management table is not limited to the above description.

Further, a process in which the server obtains a first version number of a resource owner may include (1) determining an anonymous account according to an anonymous account authentication request, and then, (2) obtaining a first version number in a version management table according to the anonymous account and a resource owner in the anonymous account request. In the foregoing manner, the server may accurately obtain a first version number corresponding to a resource owner, thereby improving feasibility and operability of the solution.

After the obtaining an authentication policy set associated with the anonymous account from the linear policy table and the performing authentication by using the authentication policy set, the method may include obtaining a target authentication result, and storing the target authentication result in a cache table, the cache table storing a plurality of authentication results.

According to an embodiment, after performing authentication on the anonymous account by using the authentication policy set, the server may further obtain a target authentication result corresponding to the anonymous account, and then, store the target authentication result in a cache table. The cache table may be used to store a plurality of authentication results. Table 4 below provides an example of a cache table.

TABLE 4

| Anonymous account | Authentication result |
| --- | --- |
| X | For resource content d of a resource owner A: read permitted and write permitted |
| X | For resource content c of a resource owner A: read permitted and write not permitted |
| X | For resource content a of a resource owner D: read not permitted and write not permitted |
| X | For resource content a of a resource owner C: read not permitted and write permitted |
| X | For resource content d of a resource owner B: read permitted and write permitted |

Table 4 is merely an example. In actual applications, a cache table may store a plurality of authentication results, and is not limited to the cache table shown in Table 4 above.

Second, after the server obtains an authentication policy set associated with a resource from the linear policy table, and performs, by using the authentication policy set, authentication on a use permission of the resource requested by the anonymous account, the server may further obtain a target authentication result corresponding to the anonymous account, and store the target authentication result in the cache table. In addition, the cache table may store a plurality of authentication results. In the foregoing manner, in a case that authentication is performed again on an anonymous account on which authentication has been performed, the server does not need to perform same operations again, and instead, directly obtains a corresponding target authentication result from the cache table, thereby accelerating authentication, which is beneficial to improving authentication performance.

For ease of understanding, the anonymous account authentication method in this application is described below in detail by using a specific application scenario.

For example, a user A may log in to a cloud service platform, and may wish to download learning materials that the user needs from the platform. The user A first uses an anonymous account to log in to the cloud service platform. The cloud service platform obtains, according to an anonymous account authentication request of the user A, an identification number, that is, a version v1.0.11, of a current version of an authentication policy table from a backend. Subsequently, the cloud service platform continues to search for an identification number of a current version of a linear policy table, where the identification number of the current version of the linear policy table is a version v1.0.11. Then, the cloud service platform determines whether the identification number of the current version of the authentication policy table matches the identification number of the current version of the linear policy table, so as to preferentially extract information from the linear policy table.

A resource owner requested by the user A is first found from the linear policy table. Assuming that the resource owner is X, resources including a resource 1, a resource 2, and a resource 3 provided by the resource owner X may be found from the linear policy table. A learning material needed by the user A is the resource 2. Therefore, permission information of resource owner X and the resource 2 is found from the linear policy table. In a case that the permission information is "read permitted and write not permitted", and the permission information corresponding to "read" (that is, downloadable) operation permission requested by the user A, the user A may download the material from the cloud service platform.

Figure 6:
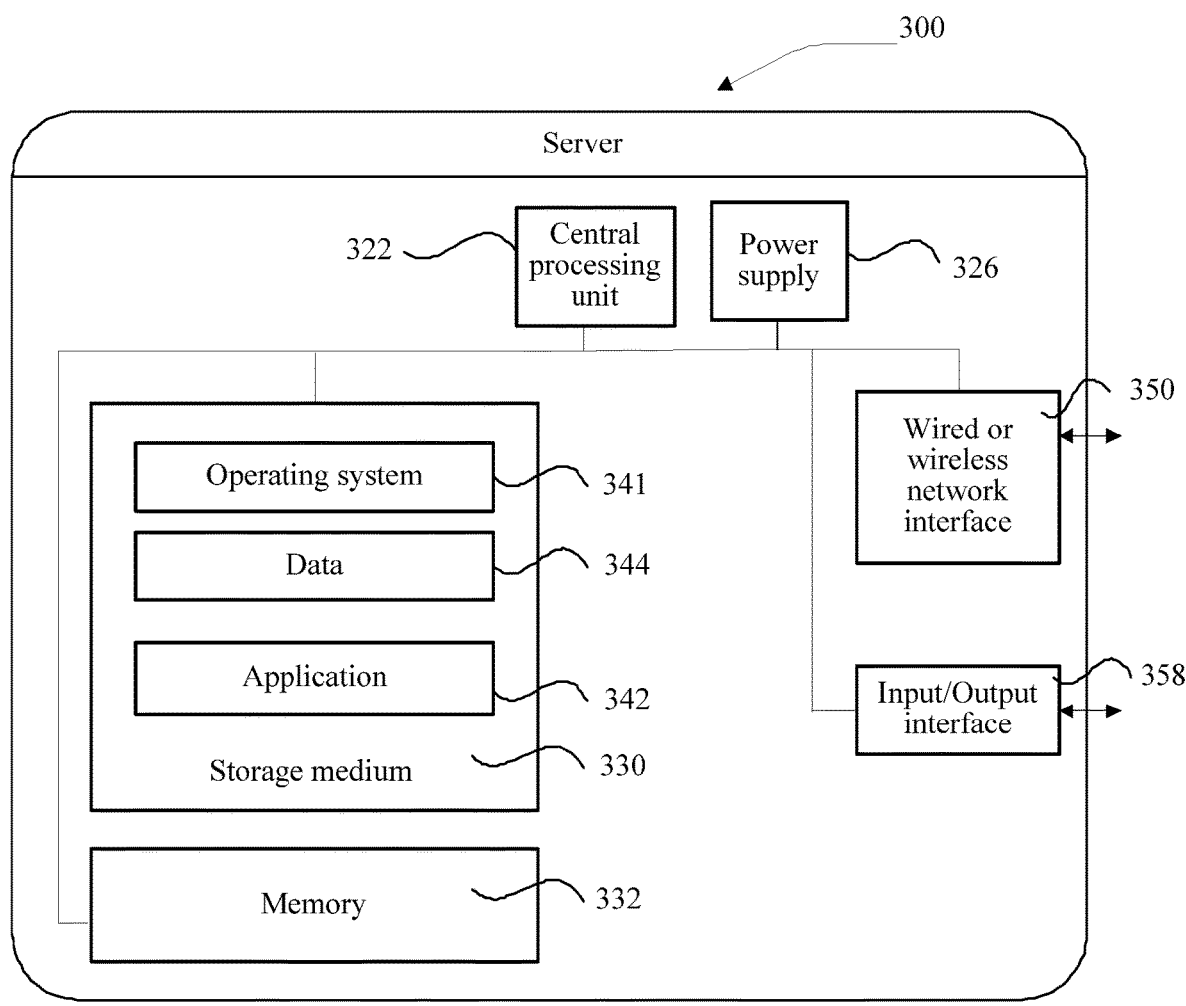
FIG. 6 is a schematic structural diagram of a server according to an embodiment.

FIG. 6 is a schematic structural diagram of a server according to an embodiment. The server 300 may vary due to different configurations or performance, and may include one or more central processing units (CPUs) 322 and a memory 332, and one or more storage media 330 that store applications 342 or data 344. The memory 332 and the storage medium 330 may be transient or persistent storages. The program stored in the storage medium 330 may include one or more modules, and each module may include a series of instructions and operations for the server. Further, the CPU 322 may be configured to communicate with the storage medium 330, and perform, on the server 300, a series of instructions and operations in the storage medium 330. The memory 332 and the CPU 322 may be connected to and communicate with each other through a bus system.

The server 300 may further include one or more power supplies 326, one or more wired or wireless network interfaces 350, one or more input/output interfaces 358, and/or one or more operating systems 341, for example, Windows Server™, Mac OS X™ Unix™, Linux, or FreeBSD™.

The steps performed by the server herein may be performed based on a server structure shown in FIG. 6.

The CPU 322 may be configured to receive an anonymous account authentication request, the anonymous account authentication request being used to request for performing, for a resource owner, authentication on a use permission of a resource by using an anonymous account; obtain a first version number of the resource owner according to the anonymous account authentication request, the first version number being used to represent an identification number of a current version of an authentication policy table, the authentication policy table including a correspondence between a resource set and a permission set; obtain a linear policy table in a case that the first version number matches a second version number, the second version number being used to represent an identification number of a current version of the linear policy table, the linear policy table including a correspondence between each piece of resource content in the resource set and each piece of permission information in the permission set; obtain an authentication policy set associated with the resource from the linear policy table; and perform authentication by using the authentication policy set, the authentication policy set including at least one authentication policy, the authentication policy being a correspondence between resource content and permission information.

The CPU 322 may be further configured to perform authentication by using the authentication policy table in a case that the first version number does not match the second version number.

The CPU 322 may be further configured to detect whether the resource set and/or the permission set changes; and update the authentication policy table in a case that the resource set and/or the permission set changes.

Further, in response to performing the operation of detecting whether the resource set and/or the permission set changes, the CPU 322 may be specifically configured to detect whether the resource content in the resource set changes, the resource content being used to represent a resource provided by the resource owner; or detect whether the permission information in the permission set changes, the permission information being used to represent a use permission of the resource content; or detect whether a correspondence between each piece of the resource content in the resource set and each piece of the permission information in the permission set changes.

After the completely updating the authentication policy table, the CPU 322 may be further configured to update the linear policy table according to the updated authentication policy table.

Additionally, after performing the operation of obtaining a first version number of the resource owner according to the anonymous account authentication request, the CPU 322 may be specifically configured to determine the anonymous account according to the anonymous account authentication request; and obtain the first version number from a version management table according to the anonymous account and the resource owner of the anonymous account request.

Further still, after performing the operation of obtaining an authentication policy set associated with the anonymous account from the linear policy table to perform authentication by using the authentication policy set, the CPU 322 may be further configured to obtain a target authentication result; and store the target authentication result in a cache table, the cache table being used to store a plurality of authentication results.

The embodiments of the present disclosure further provide a storage medium configured to store program code. The program code may be used to perform any implementation in the anonymous account authentication method according to each of the embodiments herein.

The embodiments of the present disclosure further provide a computer program product including instructions, which, when running on a computer, causes the computer to perform any implementation in the anonymous account authentication method according to each of the embodiments herein.

It may be clearly understood by a person skilled in the art that, for the purpose of convenience and brief description, a detailed working process of the foregoing system, apparatus, and unit may be referred to a corresponding process in the foregoing method embodiments.

According to embodiments of the present disclosure, it is to be understood that the disclosed system, apparatus, and method may be implemented in other manners. For example, the described apparatus embodiment is merely an example. For example, the unit division is only a logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions essentially, or the part contributing to the related technology, or all or a part of the technical solutions, may be implemented in the form of a software product. The software product may be stored in a storage medium and may include several instructions for instructing a computer device, which may be a personal computer, a server, or a network device, to perform all or a part of the steps of the methods described in the embodiments herein. The foregoing storage medium may include any medium that may store program code, such as a USB flash drive, a removable hard disk, a read-only memory (ROM), a random access memory (RAM), a magnetic disk, or an optical disc.

The embodiments herein are merely provided for describing the technical solutions of the present disclosure, and are not intended to limit the scope of the present disclosure. It is to be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. An anonymous account authentication method, performed by a server, the method comprising:
receiving, from a user, an anonymous account authentication request, requesting a resource owner to perform authentication on a use permission of a resource using an anonymous account;

obtaining a first version number of the resource owner according to the anonymous account authentication request, the first version number representing an identification number of a current version of an authentication policy table, the authentication policy table comprising a correspondence between a resource set and a permission set, wherein the resource set includes a plurality of resource contents and the permission set includes a plurality of permission information;

obtaining a linear policy table based on the first version number matching a second version number, the second version number representing an identification number of a current version of the linear policy table, the linear policy table comprising a one-to-one correspondence between each of the plurality of resource contents in the resource set and each of the plurality of permission information in the permission set;

obtaining an authentication policy set associated with the resource from the linear policy table; and performing authentication by using the authentication policy set, the authentication policy set comprising at least one authentication policy, the at least one authentication policy being at least one correspondence between one of the plurality of resource contents and one of the plurality of permission information.

2. The method according to claim 1, wherein the obtaining the first version number of the resource owner further comprises:
performing authentication by using the authentication policy table based on the first version number not matching the second version number.

3. The method according to claim 1, further comprising:
detecting whether at least one of the resource set and the permission set changes; and
updating the authentication policy table based on the detecting that the at least one of the resource set and the permission set has changed.

4. The method according to claim 3, wherein the detecting whether the at least one of the resource set and the permission set changes further comprises:
detecting whether at least one of the plurality of resource contents in the resource set changes, the at least one of the plurality of resource contents representing the resource provided by the resource owner; or
detecting whether at least one of the plurality of permission information in the permission set changes, the at least one of the plurality of permission information indicating the use permission of the resource content; or
detecting whether the correspondence between at least one of the plurality of resource contents in the resource set and at least one of the plurality of permission information in the permission set changes.

5. The method according to claim 3, wherein the updating the authentication policy table further comprises:
after updating the authentication policy table, updating the linear policy table according to the updated authentication policy table.

6. The method according to claim 1, wherein the obtaining the first version number of the resource owner further comprises:
determining the anonymous account according to the anonymous account authentication request; and
obtaining the first version number from a version management table according to the anonymous account and the resource owner of the anonymous account request.

7. The method according to claim 1, wherein, after the obtaining the authentication policy set associated with the resource from the linear policy table and the performing authentication by using the authentication policy set,
obtaining a target authentication result; and
storing the target authentication result in a cache table, the cache table storing a plurality of authentication results.

8. The method according to claim 1, wherein the resource content is parsed from the resource set and the permission content is parsed from the permission set.

9. The method according to claim 1, wherein the linear policy table comprises a plurality of authentication policies.

10. An anonymous account authentication server, comprising:
at least one memory configured to store computer program code; and
at least one processor configured to access the program code and operate as instructed by the computer program code, the computer program code comprising:
receiving code configured to cause the at least one processor to receive, from a user, an anonymous account authentication request, requesting a resource owner to perform authentication on a use permission of a resource using an anonymous account;
first obtaining code configured to cause the at least one processor to obtain a first version number of the resource owner according to the anonymous account authentication request received by the receiving code, the first version number representing an identification number of a current version of an authentication policy table, the authentication policy table comprising a correspondence between a resource set and a permission set, wherein the resource set includes a plurality of resource contents and the permission set includes a plurality of permission information;
second obtaining code configured to cause the at least one processor to obtain a linear policy table based on the first version number obtained by the first obtaining code matching a second version number, the second version number representing an identification number of a current version of the linear policy table, the linear policy table comprising a one-to-one correspondence between each of the plurality of resource contents in the resource set and each of the plurality of permission information in the permission set;
third obtaining code configured to cause the at least one processor to obtain an authentication policy set associated with the resource from the linear policy table obtained by the second obtaining code; and
authentication code configured to cause the at least one processor to perform authentication by using the authentication policy set obtained by the third obtaining code, the authentication policy set comprising at least one authentication policy, the at least one authentication policy being the correspondence between at least one of the plurality of resource contents and at least one of the plurality of permission information.

11. The anonymous account authentication server according to claim 10, wherein the first obtaining code is further configured to cause the at least one processor to:
after the obtaining, by the first obtaining code, the first version number of the resource owner according to the anonymous account authentication request, performing authentication by using the authentication policy table based on the first version number not matching the second version number.

12. The anonymous account authentication server according to claim 10, further comprising:
  detection code configured to cause the at least one processor to detect whether at least one of the resource set and the permission set changes; and
  updating code configured to cause the at least one processor to update the authentication policy table based on the at least one of the resource set and the permission set, detected by the detection code, has changed.

13. The anonymous account authentication server according to claim 12, wherein the detection code is further configured to cause the at least one processor to:
  detect whether at least one of the plurality of resource contents in the resource set changes, the resource content representing the resource provided by the resource owner; or
  detect whether at least one of the plurality of permission information in the permission set changes, the permission information indicating the use permission of the corresponding resource content; or
  detect whether the correspondence between at least one of the plurality of resource contents in the resource set and at least one of the plurality of permission information in the permission set changes.

14. The anonymous account authentication server according to claim 12, wherein the updating code is further configured to cause the at least one processor to, after updating the authentication policy table, update the linear policy table according to the updated authentication policy table.

15. The anonymous account authentication server according to claim 10, further comprising:
  determining code configured to cause the at least one processor to determine the anonymous account according to the anonymous account authentication request; and
  first obtaining code further configured to cause the at least one processor to obtain the first version number from a version management table according to the anonymous account and the resource owner of the anonymous account request.

16. The anonymous account authentication server according to claim 10, further comprising:
  fourth obtaining code configured to cause the at least one processor to obtain a target authentication result; and
  storing code configured to cause the at least one processor to store the target authentication result in a cache table, the cache table storing a plurality of authentication results.

17. A non-transitory computer-readable storage medium, storing executable instructions, the executable instructions capable of causing a computer to:
  receive, from a user, an anonymous account authentication request, requesting a resource owner to perform authentication on a use permission of a resource using an anonymous account;
  obtain a first version number of the resource owner according to the anonymous account authentication request, the first version number representing an identification number of a current version of an authentication policy table, the authentication policy table comprising a correspondence between a resource set and a permission set;
  obtain a linear policy table based on the first version number matching a second version number, the second version number representing an identification number of a current version of the linear policy table, the linear policy table comprising a one-to-one correspondence between each of the plurality of resource contents in the resource set and each of the plurality of permission information in the permission set;
  obtain an authentication policy set associated with the resource from the linear policy table; and
  perform authentication by using the authentication policy set, the authentication policy set comprising at least one authentication policy, the at least one authentication policy being a correspondence between at least one of the plurality of resource contents and at least one of the plurality of permission information.

18. The non-transitory computer-readable storage medium according to claim 17, wherein the executable instructions are further capable of causing the computer to:
  after the obtaining the first version number of the resource owner, perform authentication by using the authentication policy table based on the first version number not matching the second version number.

19. The non-transitory computer-readable storage medium according to claim 17, wherein the executable instructions are further capable of causing the computer to:
  detect whether at least one of the resource set and the permission set changes; and
  update the authentication policy table based on the detecting that the at least one of the resource set and the permission set has changed.

20. The non-transitory computer-readable storage medium according to claim 19, wherein the executable instructions are further capable of causing the computer to:
  update, after updating the authentication policy table, the linear policy table according to the updated authentication policy table.

* * * * *